United States Patent
Kashiwagi et al.

(10) Patent No.: US 9,543,733 B2
(45) Date of Patent: Jan. 10, 2017

(54) PHOTONIC BANDGAP FIBER AND FIBER LASER DEVICE USING SAME

(71) Applicants: FUJIKURA LTD., Tokyo (JP); NATIONAL UNIVERSITY CORP. HOKKAIDO UNIVERSITY, Sapporo-shi, Hokkaido (JP)

(72) Inventors: Masahiro Kashiwagi, Sakura (JP); Kunimasa Saitoh, Sapporo (JP)

(73) Assignees: FUJIKURA LTD., Tokyo (JP); NATIONAL UNIVERSITY CORP. HOKKAIDO UNIVERSITY, Sapporo-shi, Hokkaido (JP)

(*) Notice: Subject to any disclaimer, the term of this patent is extended or adjusted under 35 U.S.C. 154(b) by 0 days.

(21) Appl. No.: 14/851,632

(22) Filed: Sep. 11, 2015

(65) Prior Publication Data

US 2016/0006205 A1 Jan. 7, 2016

Related U.S. Application Data

(63) Continuation of application No. PCT/JP2014/052282, filed on Jan. 31, 2014.

(30) Foreign Application Priority Data

Mar. 14, 2013 (JP) ................................. 2013-052343

(51) Int. Cl.
*H01S 3/067* (2006.01)
*H01S 3/094* (2006.01)
(Continued)

(52) U.S. Cl.
CPC ....... *H01S 3/06741* (2013.01); *G02B 6/02309* (2013.01); *G02B 6/02323* (2013.01);
(Continued)

(58) Field of Classification Search
CPC ................ H01S 3/06741; H01S 3/0941; H01S 3/094003; H01S 3/0675; G02B 6/02309; G02B 6/02347; G02B 6/02323
See application file for complete search history.

(56) References Cited

U.S. PATENT DOCUMENTS 6,816,243 B2 * 11/2004 Shurgalin ............ C03B 37/0253
356/73.1
7,142,757 B1    11/2006 Ward
(Continued)

FOREIGN PATENT DOCUMENTS

JP   2007-316526 A   12/2007
JP   2012-73389 A     4/2012
(Continued)

OTHER PUBLICATIONS

International Search Report dated May 13, 2014, issued in counterpart Application No. PCT/JP2014/052282 (2 pages).

*Primary Examiner* — Dung Nguyen
(74) *Attorney, Agent, or Firm* — Westerman, Hattori, Daniels & Adrian, LLP (57) ABSTRACT

There is provided a photonic bandgap fiber used in a state in which at least a part of the photonic bandgap fiber is bent at radii of 15 cm or greater and 25 cm or less. A large number of high refractive index portions 57 are disposed in a nineteen-cell core type in three layers, and a V value is 1.5 or greater and 1.63 or less. In the high refractive index portions 57, conditions are defined that a relative refractive index difference is $\Delta\%$ and a lattice constant is $\Lambda$ μm so as to remove light in a higher mode at the bent portion as described above.

5 Claims, 5 Drawing Sheets (51) Int. Cl.
*G02B 6/02* (2006.01)
*H01S 3/0941* (2006.01)
(52) U.S. Cl.
CPC ........ *G02B 6/02347* (2013.01); *H01S 3/0675* (2013.01); *H01S 3/0941* (2013.01); *H01S 3/09408* (2013.01); *H01S 3/094003* (2013.01)

(56) References Cited

U.S. PATENT DOCUMENTS

| | | | | |
|---|---|---|---|---|
| 7,489,848 B2 * | 2/2009 | Kim | ................... | G02B 6/02328 385/123 |
| 2007/0009216 A1 * | 1/2007 | Russell | ............ | B29D 11/00721 385/123 |
| 2013/0209046 A1 | 8/2013 | Tanigawa et al. | | |

FOREIGN PATENT DOCUMENTS

| | | |
|---|---|---|
| WO | 2005/070170 A2 | 8/2005 |
| WO | 2009/042347 A1 | 4/2009 |

* cited by examiner

PHOTONIC BANDGAP FIBER AND FIBER LASER DEVICE USING SAME

TECHNICAL FIELD

The present invention relates to a photonic bandgap fiber that can propagate light of great power while removing light in a higher mode and propagating light in a fundamental mode, and a fiber laser device using the same.

BACKGROUND ART

A fiber laser device is known as one of laser devices used in the fields of processing machines, medical devices, measurement devices, and the like. In such a fiber laser device, light emitted from an amplification optical fiber is sometimes propagated to a desired place through a delivery fiber and then emitted. The light emitted from the delivery fiber is sometimes condensed at a lens, or the wavelength of the light is sometimes converted to the short wavelength side using a wavelength conversion element. In these cases, from the viewpoint of improving light condensing properties or from the viewpoint of improving wavelength conversion efficiency, it is preferable to emit light of excellent beam quality from the delivery fiber that the power of light in a fundamental mode (LP01 mode) is great and the power of light in a higher mode is decreased.

For this delivery fiber, a single mode fiber that propagates only light in a fundamental mode, for example, can be named. However, since the single mode fiber generally has a small effective cross sectional area ($A_{eff}$) of light, even though light of great power is to be propagated, a phenomenon such as a nonlinear optical effect caused by an increase in the power density of light occurs, and it is difficult to propagate light of great power. Therefore, an attempt is made that the effective cross sectional area of light is expanded while suppressing the propagation of light in a higher mode and propagating light in a fundamental mode. For an optical fiber used for this attempt, a photonic bandgap fiber can be named in addition to an optical fiber in which a cladding surrounds the outer circumferential surface of a core through which light is propagated.

Patent Literature 1 mentioned below describes a photonic bandgap fiber like this. In this photonic bandgap fiber, a large number of high refractive index portions are disposed in a triangular lattice shape so as to form an outer shape in a regular hexagon. However, these high refractive index portions are not disposed at the position in the center of the regular hexagon at which a high refractive index portion is to be disposed and the positions at which six high refractive index portions are to be disposed to surround the center high refractive index portion, and a core region is formed of a region including the positions at which these high refractive index portion are not disposed. In other words, the photonic bandgap fiber is a so-called seven-cell core type photonic bandgap fiber in which the core region is formed as seven high refractive index portions are not disposed. The photonic bandgap fiber is configured in which the propagation of light in a higher mode is regulated by the difference between the bending losses of light in a fundamental mode and light in a higher mode caused by bending in the state in which the photonic bandgap fiber is bent at a predetermined bending radius, and only light in the fundamental mode is substantially propagated.

[Patent Literature 1] JP-A-2012-73389

SUMMARY OF INVENTION

The effective cross sectional area of light is expressed by Expression described below:

$$A_{eff} = \frac{2\pi \left[ \int_0^\infty |E(r)|^2 r dr \right]^2}{\int_0^\infty |E(r)|^4 r dr}$$

Here, E(r) expresses the electric field distribution in the optical fiber, and r expresses the distance of the optical fiber in the radial direction.

As apparent from Expression described above, when the region of the optical fiber through which light is propagated is greater, the effective cross sectional area of light can be increased. However, as described above, since the core region is formed as seven high refractive index portions to be disposed are not disposed in the photonic bandgap fiber described in Patent Literature 1, the effective cross sectional area of light is provided according to the area of this core region. In these years, such an optical fiber is demanded that light of greater power be emitted. However, there is concern in the photonic bandgap fiber described in Patent Literature 1 that it is not enabled to provide a sufficiently large effective cross sectional area of light and a nonlinear optical effect occurs.

Therefore, it is an object of the present invention to provide a photonic bandgap fiber that can propagate light of great power while removing light in a higher mode and propagating light in a fundamental mode, and a fiber laser device using the same.

In order to solve the problem described above, the present inventors investigated to increase the area of the core region for expanding the effective cross sectional area of light more than in the seven-cell core type photonic bandgap fiber described above, for the purpose of suppressing the occurrence of a nonlinear optical effect. The present inventors came to the conclusion that in order to realize this, it is fine to provide a nineteen-cell core type photonic bandgap fiber in which high refractive index portions are not disposed at the position in the center of the regular hexagon at which a high refractive index portion is to be disposed and the positions at which six high refractive index portions are to be disposed to surround the center high refractive index portion as well as the positions at which 12 high refractive index portions are to be disposed to surround the positions at which these six high refractive index portions are to be disposed. However, a nineteen-cell core type photonic bandgap fiber is not studied before in which light in a higher mode is removed and light in a fundamental mode is propagated. Therefore, the present inventors dedicatedly investigated the conditions that can remove light in a higher mode and can propagate light in a fundamental mode in a nineteen-cell core type photonic bandgap fiber, and invented the present invention.

That is, a photonic bandgap fiber according to the present invention includes: a core region; and a cladding region having a large number of high refractive index portions disposed in a triangular lattice shape to surround the core region, the high refractive index portions having a refractive index higher than a refractive index of the core region, the cladding region including a medium having a refractive index equal to the refractive index of the core region and provided among the high refractive index portions, the photonic bandgap fiber being used in a state in which at least a part of the photonic bandgap fiber is bent at a predetermined radius, and the large number of the high refractive index portions are disposed in a nineteen-cell core type in three layers, a V value is 1.5 or greater and 1.63 or less, and Expression (1) and Expression (2) below are satisfied where a relative refractive index difference of the high refractive index portion to the medium is defined as Δ%, a lattice constant is defined as Λ μm, and the predetermined bending radius is defined as R cm, $$A_{HOM}+B_{HOM}\Lambda+C_{HOM}\Lambda^2+D_{HOM}\Lambda^3 \leq \Delta \leq A_{FM}+ B_{FM}\Lambda+C_{FM}\Lambda^2+D_{FM}\Lambda^3 \quad (1)$$

$$15 \leq R \leq 25 \quad (2)$$

(where $A_{HOM}=171.37687+2.093345R-0.1275714R^2$
$B_{HOM}=-43.29906+0.530802R+0.011094R^2$
$C_{HOM}=3.48397-0.098659R+0.000365R^2$
$D_{HOM}=-0.09034+0.003584R-0.0000348R^2$
$A_{FM}=89.98658-2.94759R+0.04246R^2$
$B_{FM}=-17.33858+0.743907R-0.011185R^2$
$C_{FM}=1.0904-0.054614R+0.0008568R^2$ and
$D_{FM}=-0.02229+0.001232R-0.00002R^2$).

The photonic bandgap fiber according to the present invention is a nineteen-cell core type. In other words, the core region is formed in which the high refractive index portions are not disposed at the position of one lattice point of the triangular lattice defined by the disposition of the high refractive index portions, the positions of six lattice points surrounding the position of the one lattice point, and the positions of 12 lattice points surrounding the positions of the six lattice points. Therefore, the core region can be expanded as compared with the seven-cell core type photonic bandgap fiber described in Patent Literature 1, so that the effective cross sectional area of light can be increased. Therefore, the power density of light can be decreased in the case where light of the same power is propagated, and thus, it is possible to propagate light of greater power.

It is noted that the V value is a value generally known as a normalized frequency, and given by Expression below:

$$V = \frac{\pi}{\lambda} d \sqrt{n_{high}^2 - n_{low}^2}$$

where λ is a use wavelength, d is the diameter of the high refractive index portion, $n_{high}$ is the refractive index of the high refractive index portion, and $n_{low}$, is the refractive index of a medium provided among the high refractive index portions.

Moreover, the conditions that light in a fundamental mode is propagated and light in a higher mode is removed in a nineteen-cell core type photonic bandgap fiber as described above are not investigated before. However, the present inventors dedicatedly investigated and revealed that in the case where the high refractive index portions are disposed at least in three layers, the V value is 1.5 or greater and 1.63 or less, and Expression (1) described above is satisfied, so that light in a higher mode can be removed at the position at which the photonic bandgap fiber is bent at radii of 15 to 25 cm. Therefore, in accordance with the photonic bandgap fiber according to the present invention, light in a higher mode can be removed and light in a fundamental mode can be propagated. It is noted that since the photonic bandgap fiber according to the present invention is a nineteen-cell core type and the high refractive index portions are disposed in a triangular lattice shape, the disposition of the high refractive index portions surrounding the core region in three layers as described above means that the high refractive index portions are disposed in three layers, a layer formed of 18 high refractive index portions in which 18 high refractive index portions are disposed in a hexagonal shape at the positions on the inner circumferential side surrounding the core region, a layer formed of 24 high refractive index portions in which 24 high refractive index portions are disposed in a hexagonal shape at the positions surrounding these 18 high refractive index portions, and a layer formed of 30 high refractive index portions in which 30 high refractive index portions are disposed in a hexagonal shape at the positions surrounding these 24 high refractive index portions.

Furthermore, preferably, the core region is doped with an active element. The active element is doped, so that it is possible to provide an amplification optical fiber that can remove light in a higher mode and can amplify light in a fundamental mode.

In addition, a fiber laser device according to the present invention is a fiber laser device including: the photonic bandgap fiber having the core region doped with the active element as described above; a seed light source configured to emit seed light incident on the core region of the photonic bandgap fiber; and a pumping light source configured to emit pumping light to pump the active element of the photonic bandgap fiber. Alternatively, a fiber laser device according to the present invention is a fiber laser device including: the photonic bandgap fiber having the core region doped with the active element as described above; a pumping light source configured to emit pumping light to pump the active element of the photonic bandgap fiber; a first FBG provided on one side of the photonic bandgap fiber and configured to reflect light having at least a part of a wavelength of light emitted from the active element pumped by the pumping light; and a second FBG provided on another side of the photonic bandgap fiber and configured to reflect light having at least a part of a wavelength of the light reflected at the first FBG at a reflectance lower than in the first FBG.

According to the fiber laser device, since light in a higher mode is removed in the photonic bandgap fiber, the amplification of light in a higher mode is suppressed, and light in a fundamental mode is amplified, so that it is possible to emit light of excellent beam quality. Moreover, the fiber laser device can emit light of high emission power because the effective cross sectional area of light is expanded in the photonic bandgap fiber.

As described above, according to the present invention, there is provided a photonic bandgap fiber that can propagate light of great power while removing light in a higher mode and propagating light in a fundamental mode, and a fiber laser device using the same.

DESCRIPTION OF EMBODIMENTS

In the following, a photonic bandgap fiber according to the present invention will be described in detail with reference to the drawings. It is noted that for easy understanding, scales in the drawings are sometimes different from scales described in the following description.

First Embodiment

Figure 1:
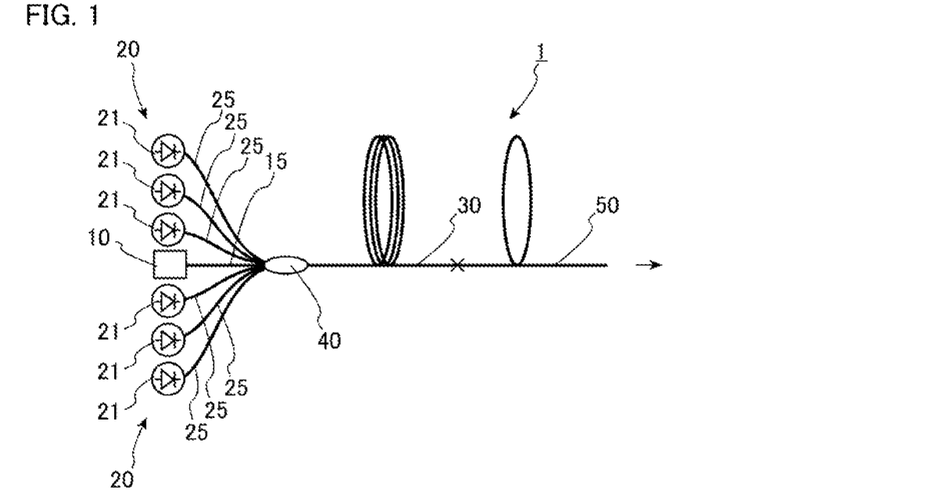
FIG. 1 is a diagram of a fiber laser device according to a first embodiment of the present invention.

FIG. 1 is a diagram of a fiber laser device according to this embodiment. As depicted in FIG. 1, a fiber laser device 1 includes a seed light source 10 that emits seed light, a pumping light source 20 that emits pumping light, an amplification optical fiber 30 to which seed light and pumping light are entered, an optical combiner 40 that joins the seed light source 10 and the pumping light source 20 to the amplification optical fiber 30, and a delivery fiber 50 whose one end is joined to the amplification optical fiber 30 as main configurations.

The seed light source 10 is configured of a laser light source formed of a laser diode, or configured of a Fabry-Perot or fiber ring fiber laser device, for example. Seed light emitted from the seed light source 10 is not limited more specifically. For example, in the case where the amplification optical fiber is doped with ytterbium as described later, laser light is at a wavelength of 1,070 nm. Moreover, the seed light source 10 is joined to an optical fiber 15 formed of a core and a cladding enclosing the core, and seed light emitted from the seed light source 10 is propagated through the core of the optical fiber 15. For this optical fiber 15, a single mode fiber, for example, is named, and in this case, seed light is propagated through the optical fiber 15 as single mode light.

The pumping light source 20 is configured of a plurality of laser diodes 21, and in the case where the amplification optical fiber is doped with ytterbium as described later, for example, the pumping light source 20 emits pumping light at a wavelength of 915 nm. Furthermore, the laser diodes 21 of the pumping light source 20 are joined to optical fibers 25, and pumping light emitted from the laser diode 21 is propagated through the optical fiber 25. For these optical fibers 25, a multimode fiber, for example, is named, and in this case, pumping light is propagated through the optical fiber 25 as multimode light.

Figure 2:
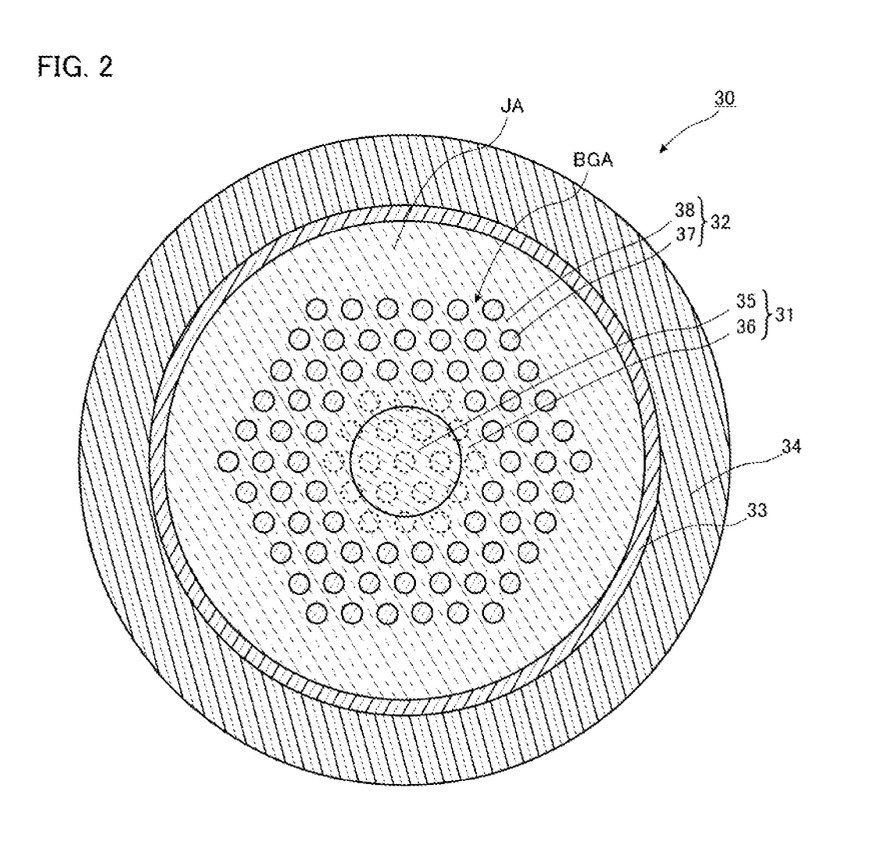
FIG. 2 is a diagram of the appearance of a cross section perpendicular to the longitudinal direction of an amplification optical fiber in FIG. 1.

FIG. 2 is a diagram of the appearance of a cross section perpendicular to the longitudinal direction of the amplification optical fiber in FIG. 1. As depicted in FIG. 2, the amplification optical fiber 30 according to the embodiment of the present invention is configured of a photonic bandgap fiber. More specifically, the amplification optical fiber 30 includes a core region 31, a cladding region 32 that surrounds the outer circumference of the core region 31, the outer cladding 33 that encloses the cladding region 32, and a buffer layer 34 that encloses the outer cladding 33 as main configurations.

The cladding region 32 includes a large number of high refractive index portions 37 and a low refractive index portion 38 provided among this large number of the high refractive index portions 37 and provided on the outer circumferences of the large number of the high refractive index portions 37. The large number of the high refractive index portions 37 are disposed in a triangular lattice shape to surround the core region 31. In the first layer formed of high refractive index portions 37 on the innermost circumferential side, 18 high refractive index portions 37 are disposed in a hexagonal shape. Moreover, in the second layer, 24 high refractive index portions are disposed in a hexagonal shape to surround 18 high refractive index portions 37 in the first layer. In the high refractive index portions 37 in the third layer, 30 high refractive index portions are disposed in a hexagonal shape to surround 24 high refractive index portions 37 in the second layer. Furthermore, the high refractive index portions 37 are not disposed on the outer circumferential side of the high refractive index portions 37 in the third layer, and the large number of the high refractive index portions 37 are disposed in three layers overall. In addition, the low refractive index portion 38 having a refractive index lower than the refractive index of the high refractive index portion 37 is provided among the high refractive index portions 37, and the low refractive index portion 38 surrounds the region on the outer circumferential side of the high refractive index portions 37 on the outermost circumferential side with no gap. Thus, a band gap region BGA is formed of the high refractive index portions 37 and the low refractive index portion 38 provided among the high refractive index portions 37, and a jacket region JA is formed of the low refractive index portion 38 surrounding the outer circumferences of the high refractive index portions 37 on the outermost circumferential side.

The high refractive index portion 37 is formed of silica ($SiO_2$) doped with a dopant such as germanium (Ge) that increases the refractive index, for example, and the low refractive index portion 38 is formed of pure silica doped with no dopant, for example.

Moreover, on the inner circumferential side of the large number of the high refractive index portions 37 disposed in a triangular lattice shape, the high refractive index portions are not disposed at 19 positions formed of the position of one lattice point of the triangular lattice defined by the disposition of the high refractive index portions 37, the positions of six lattice points surrounding the position of the one lattice point, and the positions of 12 lattice points surrounding the positions of the six lattice points, and the core region 31 described above is formed. In other words, the amplification optical fiber 30 is a nineteen-cell core type photonic bandgap fiber. It is noted that in FIG. 2, the positions of the lattice points on the core region 31 are depicted by a dotted line.

Furthermore, in the amplification optical fiber 30 according to the embodiment, the core region 31 includes a core center portion 35 positioned in the center of the core region 31 and a core peripheral portion 36 that surrounds the outer circumferential surface of the core center portion with no gap. The core center portion 35 is doped with an active element that is pumped by pumping light emitted from the pumping light source 20. For such an active element, a rare earth element such as ytterbium (Yb) can be named. For other rare earth elements, thulium (Tm), cerium (Ce), neodymium (Nd), europium (Eu), erbium (Er), and the like are named in addition to ytterbium described above. In addition, for an active element, bismuth (Bi) and the like are named, in addition to rare earth elements.

Moreover, the core center portion 35 and the core peripheral portion 36 have almost the same refractive indices. Therefore, for example, in the case where the refractive index of the core center portion 35 is changed due to an active element doped to the core center portion 35, the core center portion 35 is doped with a dopant that adjusts the refractive index as necessary. Furthermore, the core peripheral portion 36 is formed of a material similar to the material of the low refractive index portion 38 of the cladding region 32. In other words, the low refractive index portion 38 is a medium having a refractive index equal to the refractive index of the core region 31.

The refractive index of the outer cladding 33 is lower than the refractive index of the low refractive index portion 38. For a material forming the outer cladding 33, an ultraviolet curing resin is named, for example.

Moreover, for a material forming the buffer layer 34, an ultraviolet curing resin different from the resin forming the outer cladding 33 is named, for example.

The optical combiner 40 joins the optical fiber 15 and the optical fibers 25 to the amplification optical fiber 30. More specifically, in the optical combiner 40, the end face of the core of the optical fiber 15 is joined to the core region 31 of the amplification optical fiber 30. Furthermore, in the optical combiner 40, the end faces of the cores of the optical fibers 25 are joined to the cladding region 32 of the amplification optical fiber 30. Therefore, seed light emitted from the seed light source 10 is entered to the core region 31 of the amplification optical fiber 30, and pumping light emitted from the pumping light source 20 is entered to the cladding region 32 of the amplification optical fiber 30.

Figure 3:
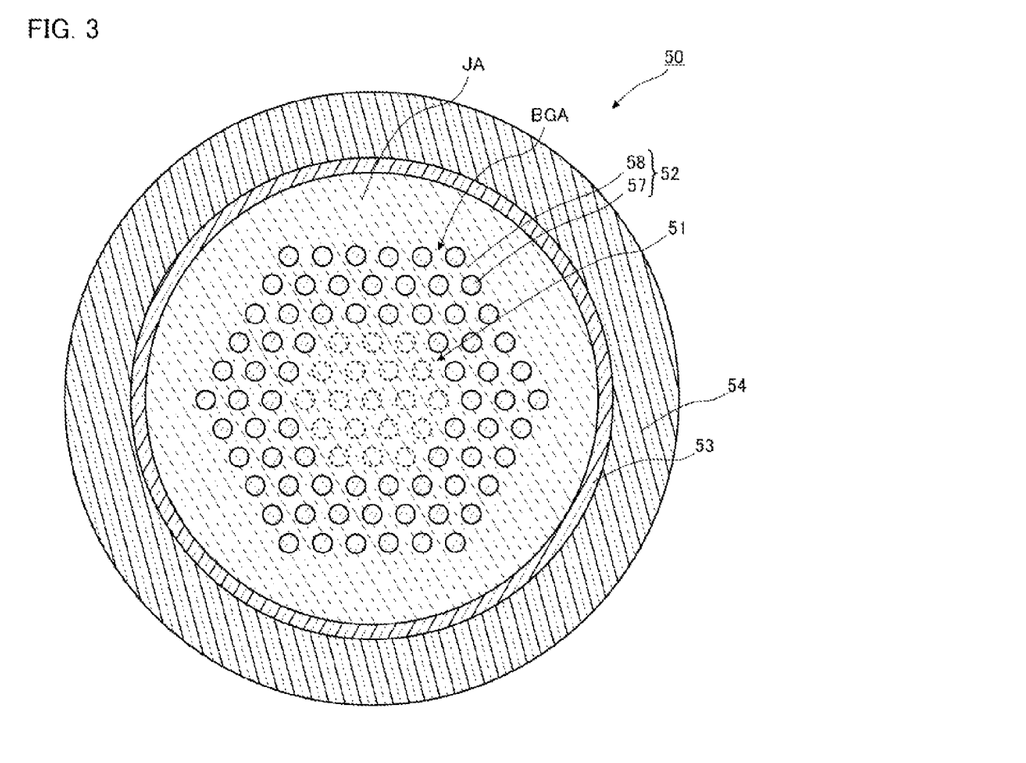
FIG. 3 is a diagram of the appearance of a cross section perpendicular to the longitudinal direction of a delivery fiber in FIG. 1.

FIG. 3 is a diagram of the appearance of a cross section perpendicular to the length direction of the delivery fiber 50 in FIG. 1. As depicted in FIG. 3, the delivery fiber 50 is configured of a photonic bandgap fiber. More specifically, the delivery fiber 50 includes a core region 51, a cladding region 52 that surrounds the outer circumference of the core region 51, and a buffer layer 54 that encloses the cladding region 32 as main configurations.

The cladding region 52 includes a large number of high refractive index portions 57 disposed similarly to the large number of the high refractive index portions 37 disposed on the cladding region 32 of the amplification optical fiber 30 and having a configuration similar to the large number of the high refractive index portions 37 and a low refractive index portion 58 provided among the large number of the high refractive index portions 57, provided on the outer circumferences of the large number of the high refractive index portions 57, and having a configuration similar to the low refractive index portion 38 of the amplification optical fiber 30. A band gap region BGA of the delivery fiber 50 is formed of the high refractive index portions 57 and the low refractive index portion 58 provided among the high refractive index portion 57, and a jacket region JA of the delivery fiber 50 is formed of the low refractive index portion 58 surrounding the outer circumferences of the high refractive index portions 57 on the outermost circumferential side.

As described above, the delivery fiber 50 is also a nineteen-cell core type photonic bandgap fiber like the amplification optical fiber 30. Therefore, on the inner circumferential side of the large number of the high refractive index portions 57 disposed in a triangular lattice shape, the core region 51 is formed as the high refractive index portions are not disposed at 19 positions formed of the position of one lattice point of the triangular lattice defined by the disposition of the high refractive index portions 57, the positions of six lattice points surrounding the position of the one lattice point, and the positions of 12 lattice points surrounding the positions of the six lattice points. It is noted that in FIG. 3, the positions of the lattice points described above are depicted by a dotted line on the core region 51. Moreover, in the delivery fiber 50, the core region 31 is formed of a material similar to the material of the low refractive index portion 58 of the cladding region 52 and has a refractive index the same as the refractive index of the low refractive index portion 58.

Furthermore, in the embodiment, the buffer layer 54 has a configuration similar to the configuration of the buffer layer of the amplification optical fiber 30.

As described above, since the distribution of the refractive indices of the core region 51 and the cladding region 52 of the delivery fiber 50 is similar to the distribution of the refractive indices of the core region 31 and the cladding region 32 of the amplification optical fiber 30 according to the embodiment, the core region 51 of the delivery fiber 50 has the waveguide conditions similar to the core region 31 of the amplification optical fiber 30.

Next, the conditions of photonic bandgap fibers configuring the amplification optical fiber 30 and the delivery fiber 50 will be described that light in a fundamental mode is propagated and light in a higher mode is attenuated.

A plurality of band gaps (pass bands) appears in photonic bandgap fibers such as the amplification optical fiber 30 and the delivery fiber 50 according to the embodiment. In these fibers, from the viewpoint that it is preferable that fluctuations in the attenuation of light propagated through the core region of a photonic bandgap fiber be small even though the V value of the photonic bandgap fiber is varied because of the occurrence of manufacture errors or a change in a use environment, such photonic bandgap fibers are often used whose V value ranges from not less than 1.5 to not more than 1.63 (belonging to the first band). The V value is a value generally known as a normalized frequency, and given by Expression below:

$$V = \frac{\pi}{\lambda} d \sqrt{n_{high}^2 - n_{low}^2}$$

where λ is a use wavelength, d is the diameter of the high refractive index portion, $n_{high}$ is the refractive index of the high refractive index portion, and $n_{low}$ is the refractive index of the low refractive index portion.

Moreover, since optical fibers for use in fiber laser devices and the like have limitations on places for accommodation, in many cases, at least a part of the optical fiber is bent at radii of 15 to 25 cm for use. Therefore, the amplification optical fiber 30 and the delivery fiber 50 according to the embodiment are in the state in which at least a part of the fibers is bent at radii of 15 to 25 cm.

Here, the present inventors investigated the relationship between the relative refractive index difference Δ% of the high refractive index portion to the low refractive index portion and the lattice constant of the high refractive index portion (a distance between the centers of the high refractive index portions) Λ μm for the conditions that light in a fundamental mode is propagated and light in a higher mode is attenuated in a nineteen-cell core type photonic bandgap fiber in which the high refractive index portions are disposed in a triangular lattice shape in three layers like the amplification optical fiber 30 and the delivery fiber 50. More specifically, this relationship was investigated on photonic bandgap fibers having a V value of 1.6 and bent at radii of 15 cm, 20 cm, and 25 cm.

Figure 4:
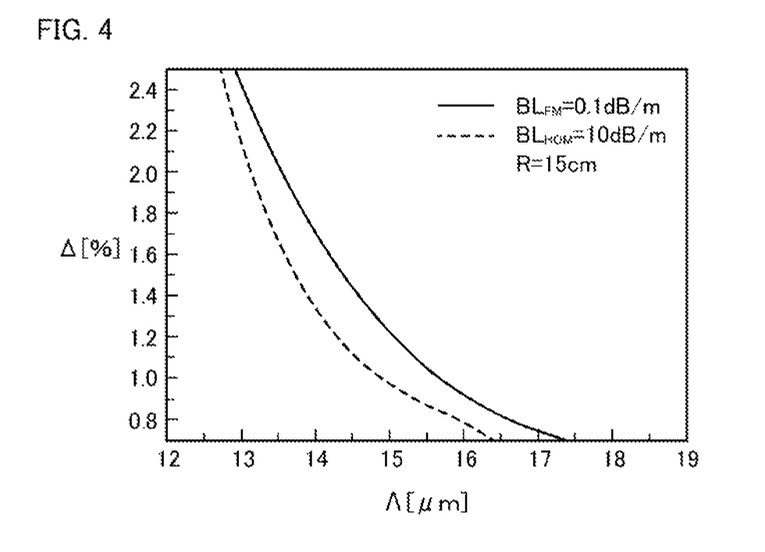
FIG. 4 is a diagram of the relationship between a relative refractive index difference Δ% of a high refractive index portion to a low refractive index portion and a lattice constant Λ μm of the high refractive index portion for the conditions that light in a fundamental mode is propagated and light in a higher mode is attenuated in a photonic bandgap fiber bent at a radius of 15 cm and having a V value of 1.6.

FIG. 4 is a diagram of the relationship between the relative refractive index difference Δ% of the high refractive index portion to the low refractive index portion and the lattice constant Λ μm of the high refractive index portion for the conditions that light in a fundamental mode is propagated and light in a higher mode is attenuated in a photonic bandgap fiber bent at a radius of 15 cm and having a V value of 1.6.

In FIG. 4, $BL_{FM}$ depicted by a solid line expresses the conditions that light in a fundamental mode is propagated at attenuation of 0.1 dB/m, and the region on the lower side of the solid line is a region in which light in a fundamental mode is propagated at attenuation lower than attenuation of 0.1 dB/m. As described above, since it can be said that light is generally and practically propagated when the optical attenuation is 0.1 dB/m or less, the conditions are provided that light in a fundamental mode can be practically propagated in the region on the lower side of the solid line.

Moreover, in FIG. 4, $BL_{HOM}$ depicted by a broken line expresses the conditions that light in a higher mode is propagated at attenuation of 10 dB/m, and the region on the upper side of the solid line is a region in which light in a higher mode is propagated at attenuation greater than attenuation of 10 dB/m. As described above, since it can be said that light is generally removed when the optical attenuation is 10 dB/m or greater, so that light in a higher mode can be removed in the region on the upper side of the solid line.

Figure 5:
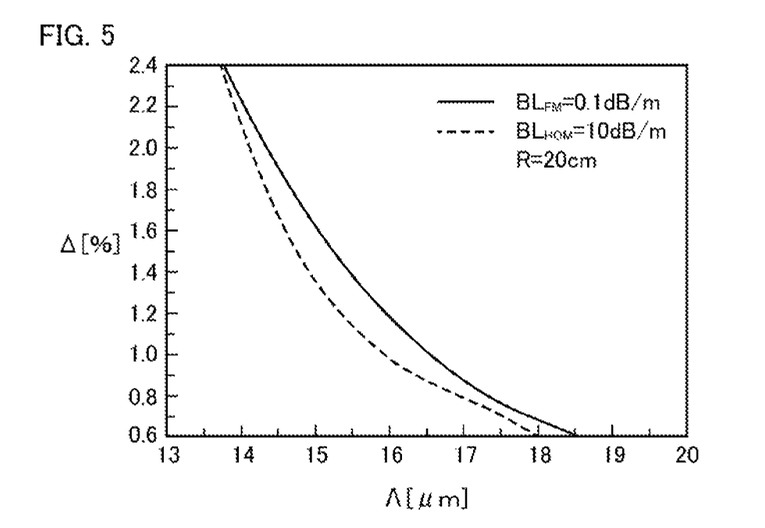
FIG. 5 is a diagram of the relationship similar in FIG. 4 for the conditions that light in a fundamental mode is propagated and light in a higher mode is attenuated in a photonic bandgap fiber the same as the fiber in FIG. 4 bent at a radius of 20 cm.
Figure 6:
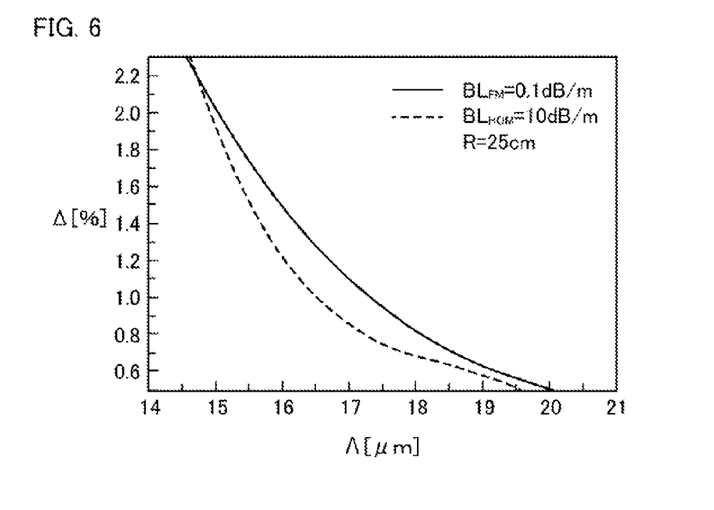
FIG. 6 is a diagram of the relationship similar in FIG. 4 for the conditions that light in a fundamental mode is propagated and light in a higher mode is attenuated in a photonic bandgap fiber the same as the fiber in FIG. 4 bent at a radius of 25 cm.

FIG. 5 is a diagram of the relationship similar in FIG. 4 for the conditions that light in a fundamental mode is propagated and light in a higher mode is attenuated in a photonic bandgap fiber the same as the fiber in FIG. 4 bent at a radius of 20 cm. FIG. 6 is a diagram of the relationship similar in FIG. 4 for the conditions that light in a fundamental mode is propagated and light in a higher mode is attenuated in a photonic bandgap fiber the same as the fiber in FIG. 4 bent at a radius of 25 cm. Also in FIGS. 5 and 6, the conditions are provided that light in a fundamental mode can be practically propagated in the region on the lower side of $BL_{FM}$ depicted by a solid line, and light in a higher mode can be removed in the region on the upper side of $BL_{HOM}$ depicted by a broken line.

As depicted in FIGS. 4 to 6, it is revealed that regions in which light in a fundamental mode is propagated and light in a higher mode is attenuated become narrower as the bending radius of the photonic bandgap fiber is more increased.

Therefore, from FIGS. 4 to 6, conditions are calculated that light in a fundamental mode is propagated and light in a higher mode is attenuated in the case where a nineteen-cell core type photonic bandgap fiber having a large number of the high refractive index portions disposed in three layers and a V value of 1.6 is bent at radii of 15 to 25 cm where the radius is defined as R cm, and Expression (1) and Expression (2) below are satisfied:

$$A_{HOM} + B_{HOM}\Lambda + C_{HOM}\Lambda^2 + D_{HOM}\Lambda^3 \le \Delta \le A_{FM} + B_{FM}\Lambda + C_{FM}\Lambda^2 + D_{FM}\Lambda^3 \quad (1)$$

$$15 \le R \le 25 \quad (2)$$

(where, $A_{HOM} = 171.37687 + 2.093345R - 0.1275714R^2$
$B_{HOM} = -43.29906 + 0.530802R + 0.011094R^2$
$C_{HOM} = 3.48397 - 0.098659R + 0.000365R^2$
$D_{HOM} = -0.09034 + 0.003584R - 0.0000348R^2$
$A_{FM} = 89.98658 - 2.94759R + 0.04246R^2$
$B_{FM} = -17.33858 + 0.743907R - 0.011185R^2$
$C_{FM} = 1.0904 - 0.054614R + 0.0008568R^2$ and
$D_{FM} = -0.02229 + 0.001232R - 0.00002R^2$).

It is noted that the present inventors think that light in a fundamental mode can be propagated and light in a higher mode can be attenuated by satisfying the conditions obtained from FIGS. 4 to 6 even in the case where the V value fluctuates in values from not less than 1.5 to not more than 1.63.

Therefore, the amplification optical fiber 30 that satisfies the conditions calculated from FIGS. 4 to 6 is in the state in which at least a part of the fiber is bent at radii of 15 to 25 cm, so that the amplification optical fiber 30 can remove light in a higher mode and can propagate light in a fundamental mode. More specifically, it is preferable to bend a portion on the incident side of seed light in the amplification optical fiber 30 in this manner because light in a higher mode can be removed before light in a higher mode is amplified. For example, it is fine that the portion on the incident side of seed light from the midpoint of the amplification optical fiber 30 in the longitudinal direction is bent in this manner.

Moreover, similarly, the delivery fiber 50 that satisfies the conditions calculated from FIGS. 4 to 6 is in the state in which at least a part of the fiber is bent at radii of 15 to 25 cm, so that the delivery fiber 50 can remove light in a higher mode and can propagate light in a fundamental mode.

Therefore, the amplification optical fiber 30 and the delivery fiber 50 of the fiber laser device 1 according to the embodiment are in the state in which at least a part of the fibers is bent at radii of 15 to 25 cm as described above, and satisfy the conditions calculated from FIGS. 4 to 6.

Next, the operation of the fiber laser device 1 will be described.

First, seed light is emitted from the seed light source 10, and pumping light is emitted from the pumping light source 20. At this time, the seed light emitted from the seed light source 10 has a wavelength of 1,070 nm, for example, as described above. The seed light emitted from the seed light source 10 is propagated through the core of the optical fiber 15, and entered to the optical combiner 40.

On the other hand, pumping light emitted from the laser diodes 21 of the pumping light source 20 has a wavelength of 915 nm, for example, as described above, and the pumping light emitted from the laser diodes 21 is propagated through the optical fibers 25, and entered to the optical combiner 40.

The seed light entered to the optical combiner 40 is entered to the core region 31 of the amplification optical fiber 30, and propagated through the core region 31. On the other hand, the pumping light entered to the optical combiner 40 is entered to the cladding region 32 of the amplification optical fiber 30, and mainly propagated through the cladding region 32.

When the pumping light is then passed through the core center portion 35 of the core region 31 in the amplification optical fiber 30, the pumping light is absorbed into an active element doped in the core center portion 35, and pumps the active element. The pumped active element causes stimulated emission due to the seed light, and the seed light is amplified by this stimulated emission, and emitted from the amplification optical fiber 30 as outgoing light.

The outgoing light emitted from the core region 31 of the amplification optical fiber 30 is then entered to the core region 51 of the delivery fiber 50, propagated through the core region 51, and emitted from the end portion on the opposite side of the portion of the delivery fiber 50 joined to the amplification optical fiber 30.

At this time, the amplification optical fiber 30 and the delivery fiber 50 according to the embodiment satisfy the conditions calculated from FIGS. 4 to 6 and are in the state in which at least a part of the fibers is bent at radii of 15 to 25 cm, so that the fiber laser device 1 can remove light in a higher mode while propagating light in a fundamental mode in the amplification optical fiber 30 and the delivery fiber 50.

In accordance with the fiber laser device 1 according to the embodiment, the amplification optical fiber 30 and the delivery fiber 50 are nineteen-cell core type photonic band-gap fibers, and the effective cross sectional area of light can be expanded, so that light of great power can be emitted, and light in a higher mode can be removed while propagating light in a fundamental mode, and thus it is possible to emit light of excellent beam quality.

Second Embodiment

Next, a second embodiment of the present invention will be described in detail with reference to FIG. 7. It is noted that components the same as or equivalent to the components of the first embodiment are designated the same reference signs, and the overlapping description is omitted except the case where the description is made more specifically.

Figure 7:
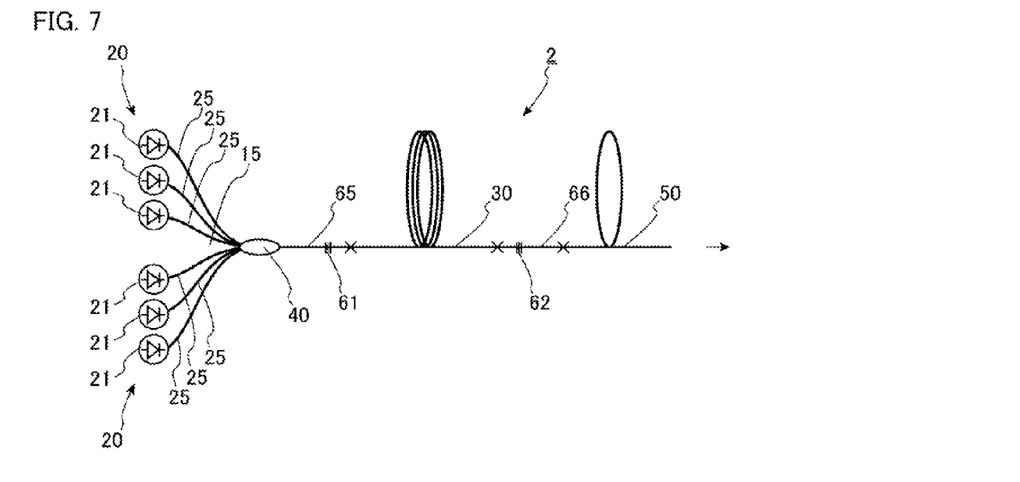
FIG. 7 is a diagram of a fiber laser device according to a second embodiment of the present invention.

FIG. 7 is a diagram of a fiber laser device according to the second embodiment of the present invention. As depicted in FIG. 7, a fiber laser device 2 according to the embodiment includes a pumping light source 20, an amplification optical fiber 30, an optical combiner 40, an optical fiber 65 provided between the amplification optical fiber 30 and the optical combiner 40, a first FBG 61 provided on the optical fiber 65, an optical fiber 66 provided on the amplification optical fiber 30 on the opposite side of the optical fiber 65 side, a second FBG 62 provided on the optical fiber 66, and a delivery fiber 50 provided on the optical fiber 66 on the opposite side of the amplification optical fiber 30 side as main configurations.

The optical fiber 65 is a double cladding fiber configured of a core, an inner cladding that surrounds the outer circumferential surface of the core with no gap, an outer cladding that encloses the outer circumferential surface of the inner cladding, and a buffer layer that encloses the outer cladding. The diameter of the core of the optical fiber 65 is almost equal to the diameter of a core region 31 of the amplification optical fiber 30, and the outer diameter of the inner cladding of the optical fiber 65 is almost equal to the outer diameter of a cladding region 32 of the amplification optical fiber 30. The refractive index of the inner cladding is lower than the refractive index of the core, and the refractive index of the outer cladding is lower than the refractive index of the inner cladding.

One end of the optical fiber 65 is joined to optical fibers 25 in the optical combiner 40. More specifically, the core of the optical fiber 25 is optically joined to the inner cladding of the optical fiber 65. Moreover, another end of the optical fiber 65 is joined to one end of the amplification optical fiber 30, the core of the optical fiber 65 is joined to the core region 31 of the amplification optical fiber 30, and the inner cladding of the optical fiber 65 is joined to the cladding region 32 of the amplification optical fiber 30.

Furthermore, the first FBG 61 is provided on the core of the optical fiber 65. Thus, the first FBG 61 is provided on one side of the amplification optical fiber 30. The first FBG 61 is configured in which a repeating portion is included that the refractive index is increased in a certain period along the longitudinal direction of the optical fiber 65 and at least a part of the wavelength of light emitted from an active element of the amplification optical fiber 30 in the pumped state is reflected by adjusting the period. In the case where the active element is ytterbium, the reflectance of the first FBG 61 is 100%, for example, at a wavelength of 1,070 nm, for example.

Moreover, the optical fiber 66 provided on the opposite side of the optical fiber 65 side of the amplification optical fiber 30 is configured of a core, a cladding that surrounds the outer circumferential surface of the core with no gap, and a buffer layer that encloses the cladding. The core of the optical fiber 66 has a configuration similar to the configuration of the optical fiber 65, for example, and the cladding of the optical fiber 66 has a configuration similar to the configuration of the inner cladding of the optical fiber 65, for example.

One end of the optical fiber 66 is joined to another end of the amplification optical fiber 30, the core region 31 of the amplification optical fiber 30 is joined to the core of the optical fiber 66, and the cladding region 32 of the amplification optical fiber 30 is joined to the cladding of the optical fiber 66. Moreover, another end of the optical fiber 66 is joined to one end of the delivery fiber 50, the core region 51 of the delivery fiber 50 is joined to the core of the optical fiber 66, and a cladding region 52 of the delivery fiber 50 is joined to the cladding of the optical fiber 66.

Furthermore, the second FBG 62 is provided on the core of the optical fiber 66. Thus, the second FBG 62 is provided on another side of the amplification optical fiber 30. The second FBG 62 is configured in which a repeating portion is included that the refractive index is increased in a certain period along the longitudinal direction of the optical fiber 66 and light at the same wavelength as the wavelength of light reflected at the first FBG 61 is reflected at a lower reflectance than in the first FBG 61. For example, the second FBG 62 is configured to reflect light having at least a part of a wavelength of light reflected at the first FBG 61 at a reflectance of 50%.

In addition, another end of the delivery fiber 50 is a free end with no connection. Also in the fiber laser device 2 according to the embodiment, similarly to the fiber laser device 1 according to the first embodiment, the amplification optical fiber 30 and the delivery fiber 50 satisfy the conditions calculated from FIGS. 4 to 6, and are in the state in which at least a part of the fibers is bent at radii of 15 to 25 cm.

In the fiber laser device 2, when pumping light is emitted from laser diodes 21 of the pumping light source 20, this pumping light is entered to the inner cladding of the optical fiber 65 in the optical combiner 40, and entered from the inner cladding of the optical fiber 65 to the cladding region 32 of the amplification optical fiber 30. Similarly to the fiber laser device 1, the pumping light pumps an active element doped in a core center portion 35 in the core region 31 of the amplification optical fiber 30. The active element in the pumped state emits light of spontaneous emission at a specific wavelength. When the active element is ytterbium, for example, the light of spontaneous emission at this time is light including a wavelength of 1,070 nm in a certain wavelength range. The light of spontaneous emission is propagated through the core region 31 of the amplification optical fiber 30, and reflected at the first FBG 61 provided on the core of the optical fiber 65, and the reflected light is propagated through the core region 31 of the amplification optical fiber 30, and reflected at the second FBG 62 to cause optical resonance. When the resonating light is propagated through the core center portion 35 of the core region 31 of the amplification optical fiber 30, the active element in the pumped state causes stimulated emission for amplification. A part of the resonating light is passed through the second FBG 62, propagated through the delivery fiber 50, and emitted from another end of the delivery fiber 50.

At this time, the amplification optical fiber 30 and the delivery fiber 50 according to the embodiment satisfy the conditions calculated from FIGS. 4 to 6 as described above and are in the state in which at least a part of the fibers is bent at radii of 15 to 25 cm, so that the fiber laser device 2 can remove light in a higher mode while propagating light in a fundamental mode in the amplification optical fiber 30 and the delivery fiber 50.

In accordance with the fiber laser device 2 according to the embodiment, the amplification optical fiber 30 and the delivery fiber 50 are nineteen-cell core type photonic bandgap fibers, and the effective cross sectional area of light can be expanded, so that light of great power can be emitted, and light in a higher mode can be removed while propagating light in a fundamental mode, and thus it is possible to emit light of excellent beam quality.

It is noted that in this example, the optical fiber 65 is not an essential configuration. In the case where the optical fiber 65 is omitted, it may be fine that similarly to the fiber laser device 1, the amplification optical fiber 30 is joined to the optical fibers 25 in the optical combiner 40 and the first FBG 61 is provided on one side of the amplification optical fiber 30. Moreover, in this example, the optical fiber 66 is not an essential configuration. In the case where the optical fiber 66 is omitted, it may be fine that the second FBG 62 is provided on another side of the amplification optical fiber 30 or on the delivery fiber 50.

As described above, the present invention is described as the embodiments are taken as examples. However, the present invention is not limited to the embodiments.

For example, the delivery fiber 50 can be omitted in the fiber laser devices 1 and 2 according to the first and the second embodiments.

Moreover, the configurations of the fiber laser devices according to the present invention can be appropriately modified as long as the amplification optical fiber 30 is used that the conditions calculated from FIGS. 4 to 6 are satisfied in the state in which at least a part of the fiber is bent at radii of 15 to 25 cm.

As described above, according to the present invention, there is provided a photonic bandgap fiber that can propagate light of great power while removing light in a higher mode and propagating light in a fundamental mode, and a fiber laser device using the same, and the use is expected in processing fiber laser devices and the like.

REFERENCE SIGNS LIST 1, 2 . . . fiber laser device
10 . . . seed light source
20 . . . pumping light source
30 . . . amplification optical fiber (photonic bandgap fiber)
31 . . . core region
32 . . . cladding region
33 . . . outer cladding
35 . . . core center portion
36 . . . core peripheral portion
37 . . . high refractive index portion
38 . . . low refractive index portion
40 . . . optical combiner
50 . . . delivery fiber (photonic bandgap fiber)
51 . . . core region
52 . . . cladding region
61 . . . first FBG
62 . . . second FBG

The invention claimed is:

1. A photonic bandgap fiber comprising:
a core region; and
a cladding region having a large number of high refractive index portions disposed in a triangular lattice shape to surround the core region, the high refractive index portions having a refractive index higher than a refractive index of the core region, the cladding region including a medium having a refractive index equal to the refractive index of the core region and provided among the high refractive index portions, the photonic bandgap fiber being used in a state in which at least a part of the photonic bandgap fiber is bent with a predetermined bending radius, wherein
the large number of the high refractive index portions are disposed in a nineteen-cell core type in three layers,
a V value is 1.5 or greater and 1.63 or less, and
Expression (1) and Expression (2) below are satisfied where a relative refractive index difference of the high refractive index portions to the medium is defined as $\Delta\%$, a lattice constant is defined as $\Lambda$ μm, and the predetermined bending radius is defined as R cm, $$A_{HOM} + B_{HOM}\Lambda + C_{HOM}\Lambda^2 + D_{HOM}\Lambda^3 \leq \Delta \leq A_{FM} + B_{FM}\Lambda + C_{FM}\Lambda^2 + D_{FM}\Lambda^3 \qquad (1)$$

$$15 \leq R \leq 25 \qquad (2)$$

where
$A_{HOM} = 171.37687 + 2.093345R - 0.1275714R^2$
$B_{HOM} = -43.29906 + 0.530802R + 0.011094R^2$
$C_{HOM} = 3.48397 - 0.098659R + 0.000365R^2$
$D_{HOM} = -0.09034 + 0.003584R - 0.0000348R^2$
$A_{FM} = 89.98658 - 2.94759R + 0.04246R^2$
$B_{FM} = -17.33858 + 0.743907R - 0.011185R^2$
$C_{FM} = 1.0904 - 0.054614R + 0.0008568R^2$ and
$D_{FM} = -0.02229 + 0.001232R - 0.00002R^2$,
wherein the V value is obtained by:

$$V = \frac{\pi}{\lambda} d \sqrt{n_{high}^2 - n_{low}^2}$$

where $\lambda$ is a use wavelength, d is a diameter of the respective high refractive index portions, $n_{high}$ is the refractive index of the high refractive index portions, and $n_{low}$ is the refractive index of the medium provided among the high refractive index portions.

2. The photonic bandgap fiber according to claim 1, wherein the core region is doped with an active element.

3. A fiber laser device comprising:

the photonic bandgap fiber according to claim 2;

a seed light source configured to emit seed light incident on the core region of the photonic bandgap fiber; and a pumping light source configured to emit pumping light to pump the active element of the photonic bandgap fiber.

4. A fiber laser device comprising:

the photonic bandgap fiber according to claim 2;

a pumping light source configured to emit pumping light to pump the active element of the photonic bandgap fiber;

a first FBG provided on one side of the photonic bandgap fiber and configured to reflect light having at least a part of a wavelength of light emitted from the active element pumped by the pumping light; and a second FBG provided on another side of the photonic bandgap fiber and configured to reflect light having at least a part of a wavelength of the light reflected at the first FBG at a reflectance lower than in the first FBG.

5. The fiber laser device according to claim 3, wherein the bent part of the photonic bandgap fiber is positioned on a seed light incident side of a longitudinal midpoint of the photonic bandgap fiber.

* * * * *